May 27, 1952      E. L. MEYER      2,598,583

LIQUID MEASURING AND DISPENSING VALVE

Filed Oct. 16, 1948

Inventor

Edwin L. Meyer

By Wooster & Davis

Attorneys

Patented May 27, 1952

2,598,583

UNITED STATES PATENT OFFICE 2,598,583

LIQUID MEASURING AND DISPENSING VALVE

Edwin L. Meyer, Bridgeport, Conn., assignor to Van Dusen and Meyer, Incorporated, Bridgeport, Conn., a corporation of Connecticut Application October 16, 1948, Serial No. 54,849

5 Claims. (Cl. 222—442)

This invention relates to a liquid measuring and dispensing device or valve, particularly a device or valve mechanism for dispensing various drinks, such, for example, as different brands of soft drinks which are pre-mixed and ready for drinking, and has for an object to provide a simple and effective device of this character which will accurately measure the individual drink being dispensed and will also discharge it into the receiving glass under low pressure or gravity, so that it will not splash out.

It is also an object to provide a device which may be used either with a coin controlled mechanism, or simply operated manually, as desired.

Still another object is to provide a device which may be changed to accurately measure individual drinks of different brands, for example, where it is desired that one brand be dispensed in larger or smaller drinks than other brands.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figure 1:
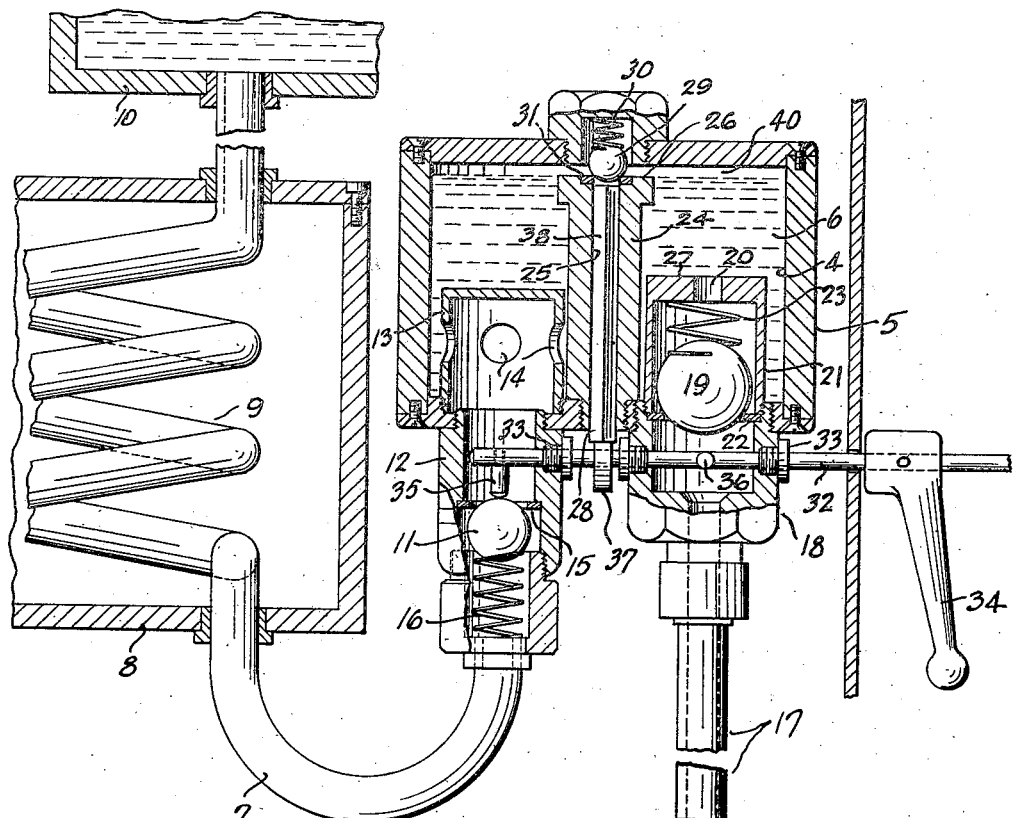
Fig. 1 is a longitudinal section through the device showing the parts in their normal position preparatory to dispensing the drink.

The device comprises a housing or body 5 enclosing a chamber 4 forming a container for a measured amount of liquid 6 to be dispensed. To this housing or container leads a supply pipe 7 from a heat exchanger or cooler 8, which usually contains a cooling coil 9 surrounded by some cooling material, such as ice or refrigerated brine, and leads from the supply drum 10 of the pre-mixed drink to be dispensed. This supply pipe 7 leads through a ball valve 11 in a fixture 12 connected to the bottom wall of the container 5. This leads to a discharge nipple 13 in the container and communicates therewith through one or more openings 14 in this nipple. A seat for the valve 11 is provided by a disc 15 mounted in the fixture 12, and a spring 16 tends to close this valve against the seat 15.

A dispensing or discharge spigot 17 leads through the connection 18 and ball valve 19 from the chamber 6 through the opening 20 in the top of the sleeve or fixture 21. This outlet valve 19 seats against the seat formed by the disc 22 and is shifted to the closed position by the spring 23. Also mounted in the bottom wall of the housing or chamber is an air vent tube or fixture 24 having an air discharge passage 25, the upper end 26 of this tube or fixture being located above the top wall 27 of the fixture 21, and the passage 25 opening through the top 26 into the chamber 4 in the housing 5 and also opening to the outer atmosphere through the lower end of this fixture, at 28. The opening in the top 26 of this tube is controlled by a ball valve 29 which is shifted to closed position by the spring 30, a suitable seat for this valve being provided at 31. Thus the passage 25 is normally closed by the valve 29 through action of the spring 30, or a combination of gravity and pressure in the chamber 4.

Mounted below the housing 5 is a control shaft 32 passing through the fixture 18 into the fixture 12 and through suitable pack or leak-proof bearings 33, and this shaft may be connected to a coin controlled mechanism (not shown). This shaft may be operated by a hand lever 34. Mounted on this shaft is a pin or lug 35 adapted at certain times to engage and unseat the valve 11. Also mounted on the shaft is a similar pin or lug 36 adapted at certain times to engage and unseat the valve 19, and between them is an eccentric or cam 37 adapted to engage a rod or bar 38 mounted in the vent passage 25 to at certain times lift this bar to unseat or open the valve 29. The bar or rod 38 is so shaped as not to close the passage 25 but permit free passage of air. These pins or lugs 35 and 36 and the cam 37 are so located that in the normal position of Fig. 1, which is the position in which the parts are normally held, preparatory to dispensing liquid, pin 35 engages the valve 11 and holds it in the open position, while the pin 36 is away from the valve 19 and this valve is closed, and the cam 37 permits the bar 38 to drop away from the valve 29 to permit this valve to close.

Figure 2:
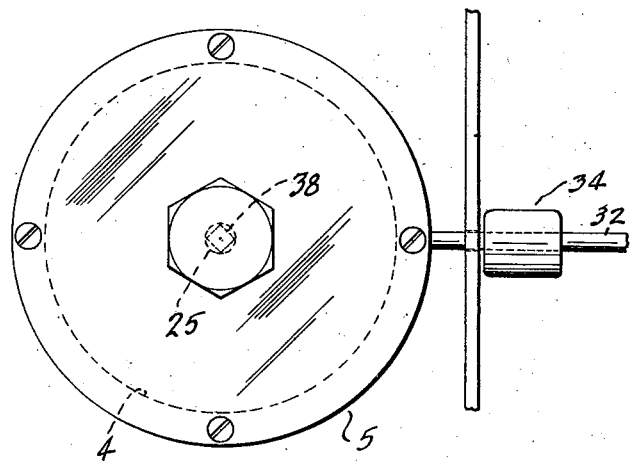
Fig. 2 is a top plan view of a portion thereof.
Figure 3:
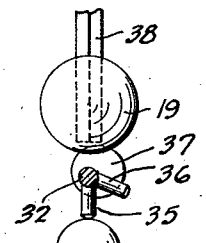
Fig. 3 is a detail showing the relative arrangement of the valve controls.

The operation is as follows:

Normally the valve 11 is held open by the pin or lug 35 as shown in Fig. 1. This lets the liquid drink from the supply drum 10 and the cooler coil 9 flow into the chamber 4 and maintains this chamber filled with this liquid at the pressure of the supply drum, normally about 70 pounds per square inch, keeping the charged gas in the liquid, any air in the chamber 4 being compressed into a small space at the top of this chamber, as indicated at 40. As stated, the valve 11 is normally kept open by the pin 35, the normal position of the shaft 32 and the operating handle 34 on it being such as to maintain this position. At this time the cam 37 permits the bar 38 to drop away from the valve 29 so that the valve 29 is closed and also the pin 36 is away from the valve 19, so that this valve is also closed. That is, in the normal position of the hand control lever 34 and shaft 32, the valve 11 is open to place the chamber 4 in communication with the supply drum 10 and the valves 19 and 29 are closed. Now, if someone wishes to draw a drink, they drop a coin in the coin controlled mechanism, if one is used, and this releases the dispensing lever or shaft 32. Of course, if the coin control is not used the shaft 32 is free to be operated. The operator then swings the lever 34, turning the shaft 32. If the pin 36 were so located as to immediately open the valve 19, the flow of liquid under the 70 pounds pressure in the chamber 4 would cause a severe blow on the glass and would splash the liquid around. To prevent this, the first operation is to shift the pin 35 from the valve 11, permitting this valve to close, and shutting off communication of the chamber 4 with the supply drum 10. Then further movement of the shaft through action of the cam 37 raises the rod 38 to lift and open the valve 29. This permits the air in the chamber to escape through the passage 25, as the rod 38 is of such a shape, as square, for example, as shown in Fig. 2, to provide a clearance in the passage 25 for escape of this air. That is, it releases the 70 pound pressure in the chamber 4. Then further movement of the shaft 32 causes the pin 36 to engage and open the dispensing valve 19, the vent valve 29 being kept open by the cam 37. As the valve 19 is now open, it permits the liquid above the top wall 27 of the fixture 21 to flow out the opening 20 and the spigot 17 into the drinking glass, air being allowed to enter through the passage 25 to displace this liquid as the valve 29 is held open. Liquid flows until its level in chamber 4 reaches the top wall 27, and it gives an accurate measure of the liquid, say, for example, 6 or 6½ ounces, as desired, depending on the height or level of the top wall 27. If it is desired to dispense a larger drink, for example, the fixture 21 is removed, and a similar fixture of less height is inserted in its place, so that the liquid in the chamber 4 will drop to a lower level on the drawing operation.

Thus, the sequence of operations after the hand lever 34 and shaft 32 is released by the coin controlled mechanism, or for hand dispensing if the coin control is not used, is to first close the valve 11 to cut off communication of chamber 4 with the liquid supply drum 10; then open the valve 29 to release the air pressure in this chamber, and then to open the valve 19 to permit a measured amount of the liquid to flow from this chamber to the drinking glass while the valve 29 remains open to permit entrance of air into the chamber. That is, all liquid above the level of the top wall 27 flows out into the glass, and this is an accurately measured amount depending on the height or level of the wall 27. Release of the hand lever 34 and turning of the shaft 32 back to its normal position will reverse this operation, this reverse movement of the shaft being performed either manually or by a spring return mechanism (not shown). On this reverse movement the dispensing valve 19 first closes, then cam 37 permits vent valve 29 to close, and then the pin 35 operates to open the inlet valve 11 to place the chamber 4 in communication with the supply drum 10 to fill the chamber 4 with liquid under pressure, which, as stated, is the normal condition before the dispensing and measuring operation, and places the whole mechanism in a condition prepared for the dispensing and measuring operation. The pins or lugs 35 and 36 are really cam means for operating their respective valves as they have a camming action on them when acting on these valves.

It will be evident from the above that a simple continuous operation of a single hand lever accurately dispenses a measured amount of liquid under atmospheric pressure by gravity, so that there is no splashing of the liquid or such a blow on the receiving glass as to force it out of the hand of the operator. It is important that each drink dispensed be accurately measured so that none of the liquid is lost or wasted, and a certain determined number of drinks may be secured from a given supply drum. After a drink has been drawn, the device is placed in condition for measuring and withdrawing another drink by a simple reverse movement of the control mechanism.

Having thus set forth the nature of my invention, I claim:

1. A liquid measuring and dispensing device comprising a chamber, an inlet connection from a source of liquid to said chamber, a valve controlling said connection, an upright vent tube mounted in and extending upwardly from the bottom wall of said chamber and having its passage communicating with said chamber adjacent the top thereof and through said bottom wall with the atmosphere, a valve controlling the entrance at its upper end to the vent connection, a bar in said tube controlling said latter valve and projecting from the lower end of the tube, an outlet connection from said chamber at a given distance below the top of the chamber, a valve controlling said latter connection, and a control means for said valves comprising a shaft, means on said shaft arranged to normally hold the inlet valve open while the other valves are closed and other means arranged on operation of said control for closing of the inlet valve, to then lift the bar to open the vent valve, and then on further operation to open the outlet valve while the vent valve is kept open.

2. A liquid measuring and dispensing device comprising a chamber, inlet, vent and outlet valves, an inlet connection from a source of liquid supply through the bottom wall of said chamber controlled by the inlet valve, an upright outlet vent extending through said bottom wall and communicating with the chamber near the top of the chamber controlled by the vent valve, an outlet dispensing connection also extending through the bottom wall controlled by the outlet valve, an upright sleeve having a connection with the chamber spaced above said bottom wall at a given level below the top of the chamber and communicating with the outlet valve, detachable means removably mounting the sleeve in the lower wall whereby sleeves of different heights may be used to vary the capacity of the chamber, a control means for said valves comprising a shaft including means for normally holding the inlet valve open and operable for closing of the valve, additional means on the shaft to then open the vent valve and hold it open, and other means on the shaft to then open the outlet valve to permit the liquid to flow from the chamber, and means for operating the control means.

3. A liquid measuring and dispensing device comprising a chamber, inlet, vent and outlet conduits connected with the bottom wall of said chamber, said vent conduit leading from the chamber near the top thereof and the outlet conduit comprising an upright sleeve having a discharge passage leading from the chamber through an inlet opening at a given level spaced above the bottom wall and below said top, detachable means for removably mounting the sleeve to permit use of sleeves of different lengths to vary the capacity of the chamber, valves controlling the respective conduits, control means for said valves comprising a shaft provided with means for normally holding the inlet valve open with the other valves closed when said control shaft is in one position, means operable on movement of said shaft from this position to close the inlet valve, and separate means on the shaft to then open the vent and outlet valves in succession, and means for operating the control shaft.

4. A liquid measuring and dispensing device comprising a chamber, inlet, vent and outlet conduits connected with said chamber, said vent conduit leading from the chamber near the top thereof through its bottom wall and the outlet conduit leading from the chamber through its bottom wall comprising an upright sleeve having an inlet from said chamber at a given level spaced above the bottom wall and below said top, means for removably mounting the sleeve whereby sleeves of different heights may be used to vary the capacity of the chamber, ball valves cooperating with seats for controlling the respective conduits, springs tending to close said valves, a control shaft, separate operating means on the shaft for opening each valve by shifting it from its seat on operation of the shaft, one of said operating means being arranged to hold the inlet valve open while the shaft is in one position, the operating means for the other valves being arranged to permit the vent and outlet valves to remain closed while the inlet valve is open, and said latter means being also arranged to open the vent and outlet valves in succession on movement of the shaft from this position to permit the inlet valve to close, and means for operating the shaft.

5. A liquid measuring and dispensing device comprising a chamber, an inlet conduit leading from a source of liquid supply, a vent conduit leading from the upper part of the chamber, an outlet conduit leading from the lower part of the chamber, a removable hollow fixture extending into the chamber over the outlet conduit including a wall above the bottom wall of the chamber provided with an inlet opening located at a given level below the top of the chamber, ball valves controlling said conduits, said fixture forming a housing enclosing the valve controlling the outlet conduit, and control means for said valves including a shaft provided with separate means normally maintaining the inlet valve open while the other valves are closed and then causing closing of the inlet valve and then opening of the vent and outlet valves in succession as the control means is shifted from this position.

EDWIN L. MEYER.

REFERENCES CITED

The following references are of record in the file of this patent:

UNITED STATES PATENTS

| Number | Name | Date |
|---|---|---|
| 373,537 | Smith | Nov. 22, 1887 |
| 1,706,631 | O'Brien | Mar. 26, 1929 |
| 2,033,329 | Craig | Mar. 10, 1936 |
| 2,070,107 | Allen | Feb. 9, 1937 |
| 2,111,040 | Allen | Mar. 15, 1938 |